May 21, 1963

T. J. BUCKNER 3,090,469

SELF-ADJUSTING BRAKE DEVICE

Original Filed Nov. 23, 1960

2 Sheets-Sheet 1

*INVENTOR.*
THOMAS J. BUCKNER
BY

ATTORNEY

May 21, 1963 T. J. BUCKNER 3,090,469
SELF-ADJUSTING BRAKE DEVICE
Original Filed Nov. 23, 1960 2 Sheets-Sheet 2
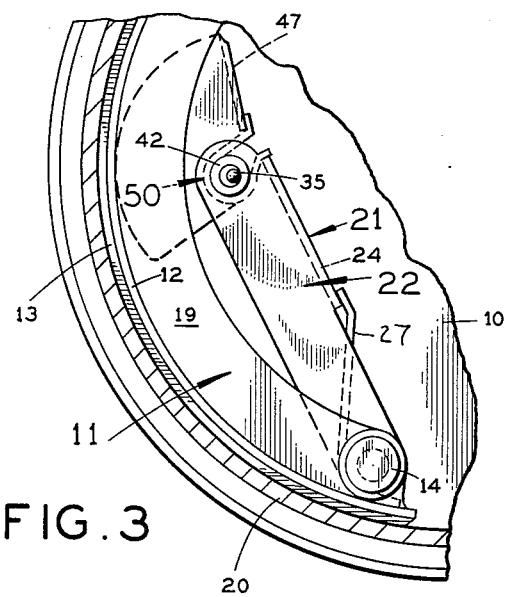
FIG. 3
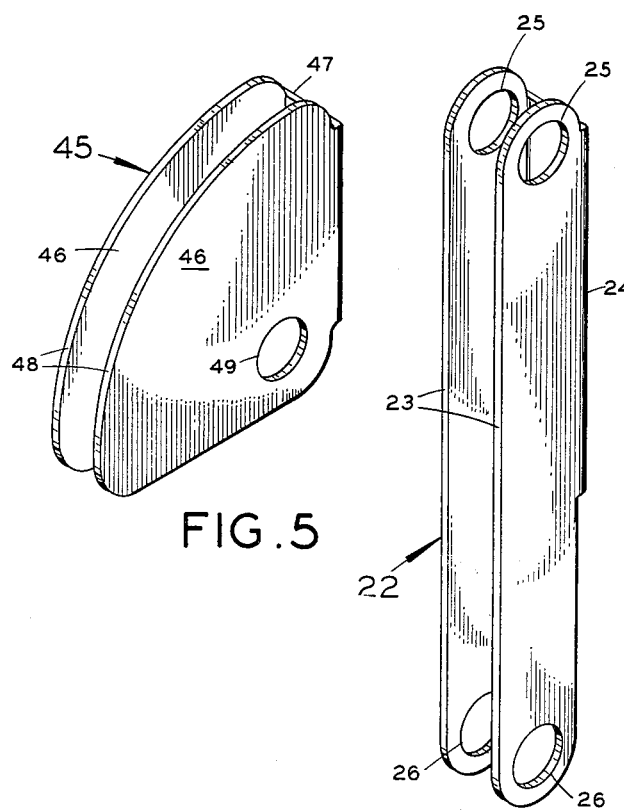
FIG. 5
FIG. 6
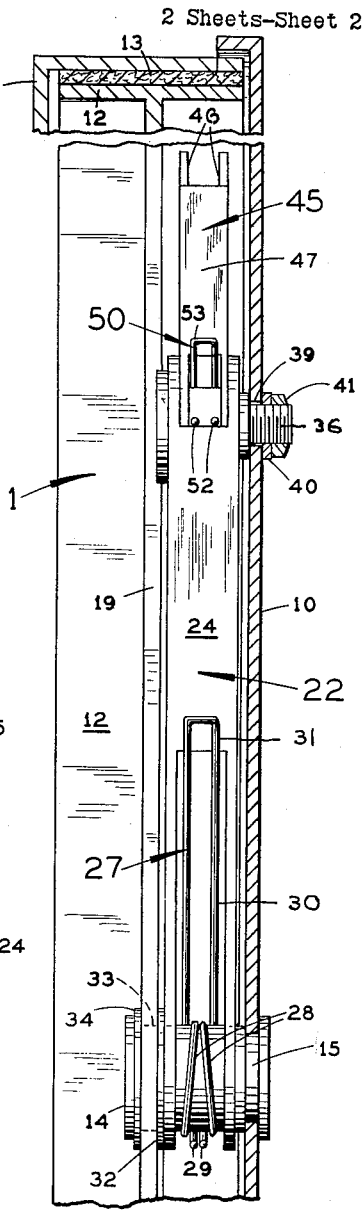
FIG. 4
INVENTOR.
THOMAS J. BUCKNER
BY
ATTORNEY

United States Patent Office 3,090,469
Patented May 21, 1963

3,090,469
SELF-ADJUSTING BRAKE DEVICE
Thomas J. Buckner, 85 Manor Drive, Newark, N.J.
Continuation of abandoned application Ser. No. 71,231,
Nov. 23, 1960. This application Mar. 21, 1962, Ser.
No. 186,576
5 Claims. (Cl. 188—79.5)

This invention relates broadly to wheel brakes, and more particularly to means for maintaining the proper desired clearance between the brake shoe and brake drum, as the brake shoe friction lining is gradually worn down in service.

The present application is a continuation of my application Serial No. 71,231, filed November 23, 1960, now abandoned.

An object of the invention is to provide a device of the above-mentioned character which is automatic in operation during the life of the brake shoe lining after initial adjustment.

Still another object is to provide brake shoe clearance maintaining means of the above-mentioned character which is highly simplified in construction, rugged and durable, economical to manufacture and install, and reliable and efficient in operation.

Other objects and advantages of the invention will become apparent during the course of the following detailed description.

In the accompanying drawings, forming a part of this application and in which like numerals are employed to designate like parts throughout the same.

Figure 1:
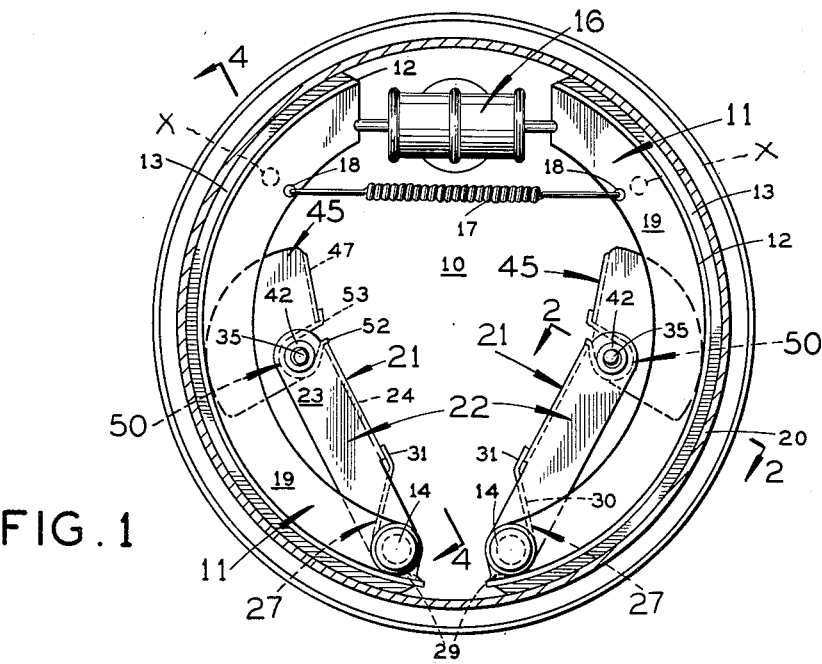
Figure 2:
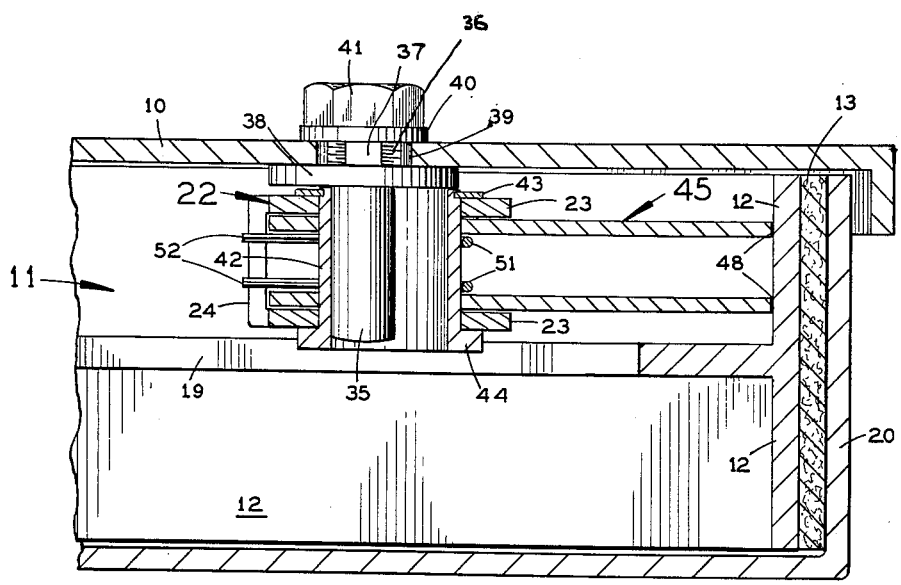

FIGURE 1 is an inner side elevational view of an automotive wheel brake mechanism equipped with the means according to the present invention for establishing and maintaining proper clearance between the brake shoe linings and brake drum, partly in section, FIGURE 2 is an enlarged fragmentary section taken on line 2—2 of FIGURE 1, FIGURE 3 is an enlarged fragmentary side elevation showing one unit of the brake shoe clearance maintaining means in an operative position, as when the brakes are active after considerable brake shoe lining wear has occurred, FIGURE 4 is an enlarged fragmentary section taken on line 4—4 of FIGURE 1, FIGURE 5 is a perspective view of a cam for engagement with the brake shoe, FIGURE 6 is a perspective view of a cam lever for connection with the cam and brake shoe anchor pin.

In the drawings, wherein for the purpose of illustration is shown a preferred embodiment of the invention, the numeral 10 designates the back plate of the brake mechanism, upon which the brake shoes and associated elements are mounted, and which back plate is fixedly secured to the hub structure of the wheel axle in a conventional manner and held against rotation. The usual pair of arcuate opposed brake shoes 11 is shown, including circumferential webs 12, upon which the usual friction linings 13 are fixedly mounted, by riveting, adhesive bonding or the like.

Corresponding ends of the brake shoes 11 are pivotally secured to the back plate 10 through the medium of the usual anchor pins 14, rigid with the back plate 10 as shown at 15. The opposite or movable ends of the brake shoes 11 are operatively interconnected by the usual hydraulic actuating means 16, likewise secured to the back plate 10. The usual strong brake shoe retracting spring 17 is provided, and connected with the brake shoes at 18 for normally maintaining the brakes inactive when the operator's foot is not touching the brake pedal to energize the actuating means 16. The brake shoes 11 are of the conventional T-shape in cross section, including an arcuate web 19, integral with the web 12 and projecting radially inwardly thereof as shown in the drawings.

The usual rotary brake drum 20 carried by the rotating wheel is indicated in the drawings surrounding the opposed brake shoes 11 and other elements of the brake mechanism in the conventional manner. The construction thus far described is that of any conventional or standard automotive brake assembly, and a further detailed description of these conventional components is believed to be unnecessary herein.

The means for establishing and maintaining the proper clearance between the brake shoe linings and brake drum irrespective of wear upon the linings, in accordance with the invention, comprises a pair of identical units 21 associated with each brake shoe 11 and anchor pin 14. Accordingly, a description of one of the units 21 in full detail should be sufficient herein.

Each unit 21 comprises a cam lever 22, FIGURE 6, including spaced parallel sides 23 and an integral back wall 24, extending for a portion only of the length of the cam lever and disposed at right angles to the sides 23. The sides 23 of each cam lever 22 are provided with aligned openings 25 and 26 near its opposite ends, for a purpose to be described.

Associated with each cam lever 22 is a relatively strong torsional coil spring 27, preferably about two-thirds as powerful as the brake shoe retracting spring 17. The spiral convolutions 28 of spring 27 are engageable between the sides 23 of the cam lever 22 and aligned with the openings 26 and engageable therewith over the stationary anchor pin 14, as shown in FIGURE 4. The inner ends of the spiral convolutions 28 carry short generally radial extensions 29, integral therewith, adapted to bear against the inner faces of the brake shoe web 12 as shown in FIGURE 1. The outermost convolutions 28 of the cam lever spring 27 are formed to provide a tangentially extending integral spring loop 30, having an angled U-shaped extremity 31 to bear upon the cam lever back wall 24 in assembly, see FIGURE 1. The spring loop 30 extends diagonally across and between the sides 23 of the cam lever as shown in FIGURE 1. Each spring 27 is tensioned to resiliently urge the associated cam lever 22 outwardly or toward the brake drum 20.

A spacer ring 32 is preferably mounted upon each anchor pin 14 between the outer side of cam lever 22 and the adjacent radial web 19 of the brake shoe 11. This spacer ring serves to maintain the cam lever properly spaced from the web 19 for swinging movement relative thereto, during the operation of the brake mechanism. The web 19 of each brake shoe 11 also has an opening 33 to receive the anchor pin 14, outwardly of the spacer 32, and the brake shoe, cam lever 22 and associated elements are secured pivotally to the anchor pin 14 by a conventional snap ring 34 or the like.

A cylindrical sleeve 42 engages through the aligned openings 25 of each cam lever 22, and the sleeve 42 is restrained against outward movement by a snap ring 43 engageable within a groove near the inner end of the sleeve and bearing upon the inner side 23 of the cam lever 22, FIGURE 2. The outer end of the sleeve 42 may carry an integral enlarged flange 44 engaging the outer side 23 of the cam lever, or if preferred, a second snap ring similar to the snap ring 43 may be utilized upon the outer end of the sleeve 42 for securing the cam lever thereto. The bore of the sleeve 42 receives the clearance pin 35 therein, and this bore is larger than the diameter of the clearance pin 35 by an amount exactly equal to the predetermined brake shoe-to-drum clearance desired, for a purpose to be described.

Adjacent the upper end of each cam lever 22 and inwardly of the associated brake shoe 11, the stationary clearance pin 35 is anchored to the back plate 10. Each clearance pin 35 includes an inner screw-threaded extension 36 having a pair of opposed flat faces 37 formed thereon, and an intermediate enlarged annular shoulder 38 integral therewith. The screw-threaded extension 36 is received within an initial-adjustment-slot 39, formed through the back plate 10 and having flat sides to coact with the flat faces 37 so that the clearance pin 35 will not turn while tightening the nut 41. The flat washer 40 and nut 41 are mounted upon screw-threaded extension 36 inwardly of the back plate 10, and the annular shoulder 38 of the clearance pin 35 is thus clamped to the outer face of the back plate, FIGURES 2 and 4. The diameter of the clearance pin 35 is smaller than the bore of the cylindrical sleeve 42, which receives the clearance pin 35 therein, by an amount exactly equal to the predetermined brake shoe-to-drum clearance desired.

A brake shoe cam 45 shown particularly in FIGURE 5 includes a pair of sector-shaped sides 46, connected along corresponding edges by a generally radial web 47, integral therewith. The cam sides 46 have arcuate cam edges 48 which are somewhat eccentric with respect to a pivot opening 49 formed through the cam sides 46 near the inner corner of the same remote from the edges 48. The cam 45 is disposed in assembly between the sides 23 of cam lever 22, and the openings 49 of the cam receive the sleeve 42 rotatably therein as best shown in FIGURE 2.

A cam spring 50, somewhat similar to the cam lever spring 27, is provided for each cam 45, and each cam spring 50 is preferably about one-fourth as powerful as the cam lever spring 27. The spring 50 includes torsional coils 51 having inner end extensions 52, integral therewith, and an outer U-shaped spring loop 53 integral therewith. The coils 51 of the cam spring 50 are disposed inwardly of the cam sides 46, and the coils 51 also receive the cylindrical sleeve 42 in assembly. The spring loop 53 is adapted to bear against the radial web 47 of the cam 45, FIGURES 1 and 4, and the spring ends 52 react against the upper edge of the back wall 24 of cam lever 22 as shown in the drawings. The cam spring 50 serves to urge each brake shoe cam 45 outwardly or toward the associated brake shoe 11. That is to say, with particular reference to FIGURE 1, the spring 50 of the left-hand unit 21 tends to urge the left-hand cam 45 in the counterclockwise direction, while the spring 50 of the right-hand unit 21 urges the associated cam 45 in the clockwise direction, FIGURE 1.

With continued reference to the brake shoe cams 45 in FIGURE 1, the eccentric arcuate cam edges 48 are disposed increasingly further from the cam pivot opening 49 toward the top corners of the cams as viewed in FIGURE 1. That is to say, with reference to the left-hand unit 21 in FIGURE 1, as the cam 45 is permitted to turn counter-clockwise upon its pivot when the brake lining wear gradually becomes sufficient to cause the brake shoe 11 to travel toward the drum 20 a distance greater than the cam 45 can follow and remain in contact with the circumferential web 12 of the brake shoe because of the limitation imposed upon the cam's outward movement by the relatively different diameters of the clearance pin 35 and the bore of the cylindrical sleeve 42 as previously described, the starting point of the shoe's outward movement when the brakes are rendered active would be continually advanced by an amount exactly equal to the wear taking place on the lining. The same is true in connection with the cam 45 of the right-hand unit 21 in FIGURE 1, when the latter turns clockwise upon its pivot. The arcuate cam edges 48 of each cam 45 are in constant contact with the inner face of the circumferential brake shoe web 12, as shown.

The operation of the invention is as follows: The retracting spring 17 holds the brake linings 13 normally spaced from the inner face of the brake drum 20 when the brakes are inactive. The hydraulic actuating means 16 serves to shift the brake shoes 11 and brake linings into frictional engagement with the drum to retard the rotation of the latter when the brakes are rendered active by the operator.

It is desirable to establish a certain desirable clearance between the linings 13 and brake drum when the brakes are inactive and to maintain this clearance constant during the life of the brake linings, regardless of the extent of wear upon the linings which is inevitable when the brakes are in service. With continued reference to FIGURES 1 and 2, and while the brake mechanism is active as shown in these figures, the difference in diameters of the clearance pins 35 and the bores of the sleeves 42 will equal and determine the amount of clearance between the brake shoe linings 13 and the inner face of the drum 20. Since the clearance pins 35 are stationary relative to the cam levers 22, the latter may swing upon the anchor pins 14 through an arc at their upper ends equal to the brake shoe clearance.

When the brakes are rendered active, and the actuating means 16 shifts the brake shoes 11 and their linings outwardly into contact with the brake drum 20, the cam lever springs 27 immediately cause the cam levers 22 to swing outwardly toward the brake drum by an amount equal to the clearance between the sleeve 42 and the pin 35. When this condition is reached, the clearance pins 35 positively restrain the cam levers 22 from further outward swinging movement.

However, when some brake lining wear has occurred, the brake shoes 11 will move outwardly an increased distance equal to the amount of brake lining wear, before engaging the drum 20. The cam levers 22 will not be capable of following the outward movement of the brake shoes through this increased arc because of the action of the fixed clearance pins 35. However, the cam springs 50 will now react upon the cams 45 and turn the latter in a direction, FIGURE 1, for maintaining the eccentric arcuate cam edges 48 in constant engagement with the brake shoe webs 12, as the latter continue to move outwardly toward the drum 20 when brake lining wear has occurred. The eccentric cams 45 are designed with a factor of safety enabling them to adjust automatically to or compensate for more than the maximum possible amount of brake lining wear which is encountered.

When the brakes are again rendered inactive by the operator, the brake shoes will move inwardly away from the brake drums under the influence of the spring 17. Since the cams 45 are in constant contacting engagement with the inner sides of the brake shoes, the cams and the cam levers 22 will be shifted inwardly away from the brake drums a distance equal to the clearance between the pins 35 and the inner bores of the sleeves 42 thus, arresting the inward movement of the brake shoes to the extent that the sleeves move upon the pins 35. This degree of movement is calculated to be the degree of spacing movement between the lining of the brake shoes and the brake drums.

It may thus be seen that by the coaction of the stationary clearance pins 35 with the swingable cam levers 22 and their cams 45, the initially established brake shoe clearance is maintained constant throughout the life of the brake shoe linings 13, regardless of the degree of wear upon the latter. Even though the brake shoes 11 must separate or move outwardly an ever greater distance to render the brakes active as lining wear increases, the clearance between the brake shoes and drum 20 will always be maintained constant, as explained. The cams 45 will "take up" or compensate for brake lining wear automatically, and these cams will always remain in engagement with the brake shoe webs 12 as stated. As lining wear increases, the eccentric cams 45 will function automatically in conjunction with the cam levers 22 and clearance pins 35 to maintain the clearance space constant and equal at all times. That is to say, an ever wider portion of each eccentric cam 45 will automatically slide into engagement with the brake shoe web 12 to compensate for brake lining wear as such occurs, and this arrangement compensates for the fact that the arc of movement of the cam levers 22 is fixed or limited by the clearance space between the clearance pins 35 and the bores of sleeves 42 carried by the cam levers 22.

When installing the mechanism, the cam 45 and cam lever 22 of each unit 21 are assembled with the sleeve 42, cam spring 50 and associated elements. The threaded extension 36 of clearance pin 35 is then connected in the slot 39 of back plate 10 and the nut 41 is lightly tightened against the back plate. The cam and cam lever assembly is then slipped over the clearance pin 35, and the latter is received within the sleeve 42; and at the same time the lower end of the cam lever and its spring 27 and associated elements is engaged over the fixed anchor pin 14. The spacer ring 32 is next installed, and finally the brake shoe 11 is installed upon the anchor pin 14. The opposite ends of the brake shoes are engaged with the wheel cylinder 16 or actuating means, as shown.

At this point, the cams 45 are rotated to their outermost positions with respect to the levers 22 against the force of the cam springs 50, and the cams are permitted to maintain this position while bearing against the back of the brake shoes under the influence of the pressure applied to them by the cam levers. The clearance pins 35 are now moved in their slots to a position where they will be in contact with the bores of the sleeves 42, at points a maximum distance away from the brake shoes. The brake drum 20 is then installed.

Initial adjustment is obtained by inserting a rod or screw driver through openings X in the back plate 10, for this purpose, and engaging the brake shoes 11 in such a way that they may be moved outwardly and into engagement with the brake drum 20. While the brake shoes are held in this position, and with the clearance pins 35 in contact with the bores of the sleeves 42 as described above, the nuts 41 are fully tightened, and the rod or screw driver may then be removed from the openings X.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described the invention, what is claimed is:

1. In a wheel brake, a relatively stationary back plate, a rotary drum, at least one brake shoe pivoted to the back plate within the drum and shiftable toward and from the drum, means to actuate said shoe, a friction lining carried by the shoe and engageable with the drum and subject to wear, a cam lever pivoted to the back plate with said shoe, a spring associated with the cam lever and constantly urging the same toward said shoe and drum, a clearance pin fixed to the back plate near the free end of the cam lever, a sleeve carried by the cam lever and engageable over the clearance pin and having a bore larger than the clearance pin, an eccentric cam pivoted to said sleeve and cam lever and having a cam edge engaging said shoe, and a second spring associated with the cam and cam lever and serving to urge the cam constantly into engagement with the shoe, whereby wear on said lining is compensated for automatically by said eccentric cam and the desired clearance between the lining and drum is automatically maintained constant.

2. In brake mechanism, a relatively stationary back plate, a rotary drum, an arcuate brake shoe disposed within the brake drum and having one end pivoted to the back plate and carrying a brake lining for frictional engagement with said drum, actuator means connected with the free end of said shoe to shift the latter toward the drum, a spring to hold said shoe normally retracted, a cam lever pivoted to the back plate near said shoe, a first spring connected with the cam lever and urging the same toward said shoe and drum, an eccentric cam, a sleeve mounted upon the cam lever and pivotally supporting said cam, a second spring of less strength than said first spring connected with the cam and cam lever and urging the cam into constant engagement with said shoe, and a clearance pin fixed to the back plate and engaging within said sleeve and having a loose fit therein to allow limited swinging movement of the free end of the cam lever in amount equal to the desired clearance between the brake shoe lining and drum, said cam serving automatically to maintain said clearance between the lining and drum equal to the clearance between the bore of said sleeve and said clearance pin.

3. In brake mechanism according to claim 2 and wherein said eccentric cam is sector-shaped and having an eccentric cam edge generated so as to be increasingly further from the bore of said sleeve radially from one end of the cam edge toward the other end thereof.

4. In brake mechanism, a back plate, a rotary brake drum, brake shoes having linings disposed within said drum and pivoted to the back plate, means to shift said shoe and lining into engagement with said drum and to retract the same therefrom, resilient lever means pivoted to the back plate and co-axial to the pivot of the brake shoes and biased in a direction toward said drum, resilient eccentric cam means pivoted to said lever means and biased so as to constantly engage said shoe and compensate automatically for wear on said lining, and fixed stop means carried by the back plate near said lever means, said lever means having a clearance opening larger than said stop means and receiving the latter, whereby the stop means positively limits the swinging movement of the lever means toward and away from said drum.

5. Brake mechanism comprising a back plate, a rotatable brake drum, a pair of opposed brake shoes having linings subject to wear disposed within said drum and having corresponding ends pivoted to the back plate, means connected with said shoes near their other corresponding ends to shift the same with said linings into engagement with said drum and to retract the shoes and linings from the drum, a unit associated with each brake shoe to compensate for lining wear and to automatically maintain the clearance between the lining and drum constant when the brake mechanism is in service, each unit comprising a cam lever having one end pivoted to said back plate with said shoe, a spring connected with the cam lever and urging the same toward the shoe and brake drum, a tubular element carried by the cam lever near its free end, a clearance pin secured to the back plate and engaging within the tubular element and being smaller than the bore of the tubular element so that the cam lever may swing through a limited distance fixed by the difference in diameters of the tubular element and clearance pin, a cam pivoted upon the tubular element and swingable relative to the cam lever and bodily movable therewith and having an arcuate cam edge for engagement with the brake shoe, said cam edge being eccentric to the axis of the tubular element, and a spring interconnecting the cam lever and cam and constantly urging the cam into engagement with said brake shoe.

References Cited in the file of this patent
UNITED STATES PATENTS

| | | |
|---|---|---|
| 2,301,948 | Hell | Nov. 17, 1942 |
| 2,583,970 | Schultz | Jan. 29, 1952 |
| 2,714,941 | Bauman | Aug. 9, 1955 |